US011354388B2

(12) United States Patent
Chabanne et al.

(10) Patent No.: US 11,354,388 B2
(45) Date of Patent: Jun. 7, 2022

(54) METHOD FOR DETECTING BOTS IN A USER NETWORK

(71) Applicant: Idemia Identity & Security France, Courbevoie (FR)

(72) Inventors: Hervé Chabanne, Courbevoie (FR); Vincent Bouatou, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 46 days.

(21) Appl. No.: 16/826,999

(22) Filed: Mar. 23, 2020

(65) Prior Publication Data
US 2020/0311232 A1    Oct. 1, 2020

(30) Foreign Application Priority Data

Apr. 1, 2019 (FR) ...................... 1903448

(51) Int. Cl.
*G06F 11/00* (2006.01)
*G06F 12/14* (2006.01)
(Continued)

(52) U.S. Cl.
CPC .......... *G06F 21/316* (2013.01); *G06F 21/552* (2013.01); *H04W 12/08* (2013.01);
(Continued)

(58) Field of Classification Search
CPC ................. G06F 21/316; G06F 21/552; G06F 2221/2133; G06F 21/44; H04W 12/63; H04W 12/69; H04W 12/122; H04W 12/08
See application file for complete search history.

(56) References Cited

U.S. PATENT DOCUMENTS 9,942,214 B1    4/2018 Burciu et al.
10,565,385 B1 *    2/2020 Ravi ...................... G06F 21/552
(Continued)

OTHER PUBLICATIONS

Correspondence from the French National Institute of Industrial Property Office (INPI—Institute National De La Proprit Industrielle) for FR1903448 dated Nov. 25, 2019; Preliminary Research Report of the French National Institute of Industrial Property Office for FR1903448 dated Nov. 20, 2019; and Written Opinion on the Patentability of the Invention issued by the French National Institute of Industrial Property Office for FR1903448.

*Primary Examiner* — Amie C. Lin
(74) *Attorney, Agent, or Firm* — Womble Bond Dickinson (US) LLP

(57) ABSTRACT

A method for detecting bots in a user network (R), the method comprising the following steps: receiving (102) by a user terminal (2) an identifier (ID) associated with a network user account; transmitting (104), by the user terminal (2), the identifier (ID) to an access control system (3) configured to determine whether or not a mobile terminal owner has the right to access an area or service, the area or service being independent of the user network (R); transmitting (106), by the access control system (3) to the server (1), a representative data element supporting that the identifier (ID) has been received by the access control system (3); and using (108) by the server (1) the representative data element to determine whether the user of the account associated with the identifier (ID) is a bot or not.

14 Claims, 2 Drawing Sheets

(51) Int. Cl.

| | | |
|---|---|---|
| *G06F 12/16* | (2006.01) | |
| *G08B 23/00* | (2006.01) | |
| *G06F 21/31* | (2013.01) | |
| *G06F 21/55* | (2013.01) | |
| *H04W 12/08* | (2021.01) | |
| *H04W 12/63* | (2021.01) | |
| *H04W 12/69* | (2021.01) | |
| *H04W 12/122* | (2021.01) | |

(52) U.S. Cl.
 CPC ......... *H04W 12/122* (2021.01); *H04W 12/63* (2021.01); *H04W 12/69* (2021.01); *G06F 2221/2133* (2013.01)

(56) References Cited

U.S. PATENT DOCUMENTS

| | | | |
|---|---|---|---|
| 2016/0006744 A1* | 1/2016 | Du | ........................... H04L 67/18 726/4 |
| 2016/0156653 A1 | 6/2016 | Zhang et al. | |
| 2017/0185758 A1 | 6/2017 | Oliker et al. | |
| 2018/0336326 A1 | 11/2018 | Wallace et al. | |
| 2019/0349354 A1* | 11/2019 | Baumgarte | ............. H04L 63/10 |
| 2020/0137073 A1* | 4/2020 | Palan | .................. G06F 16/2423 |

* cited by examiner

[Fig. 1]
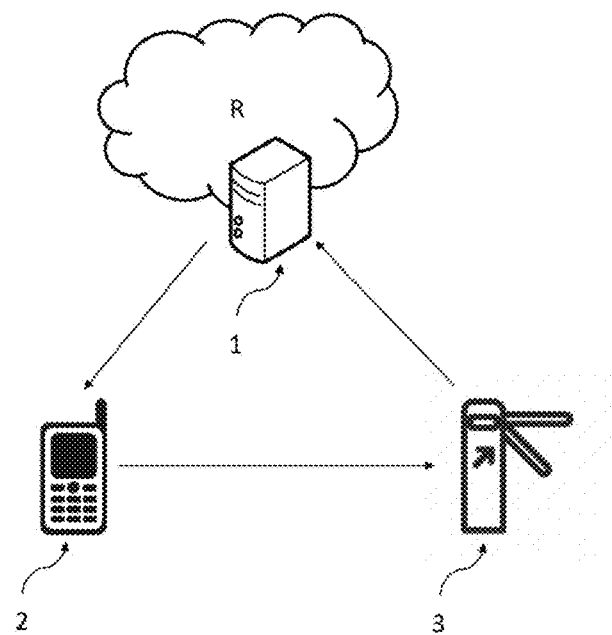
[Fig. 2]
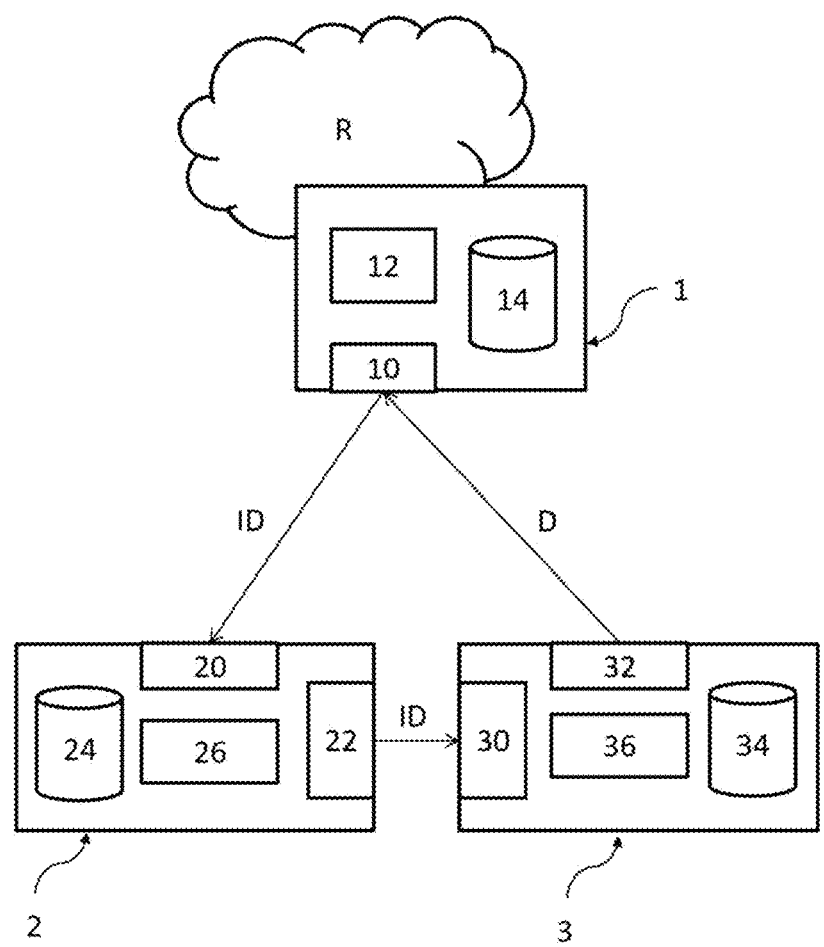

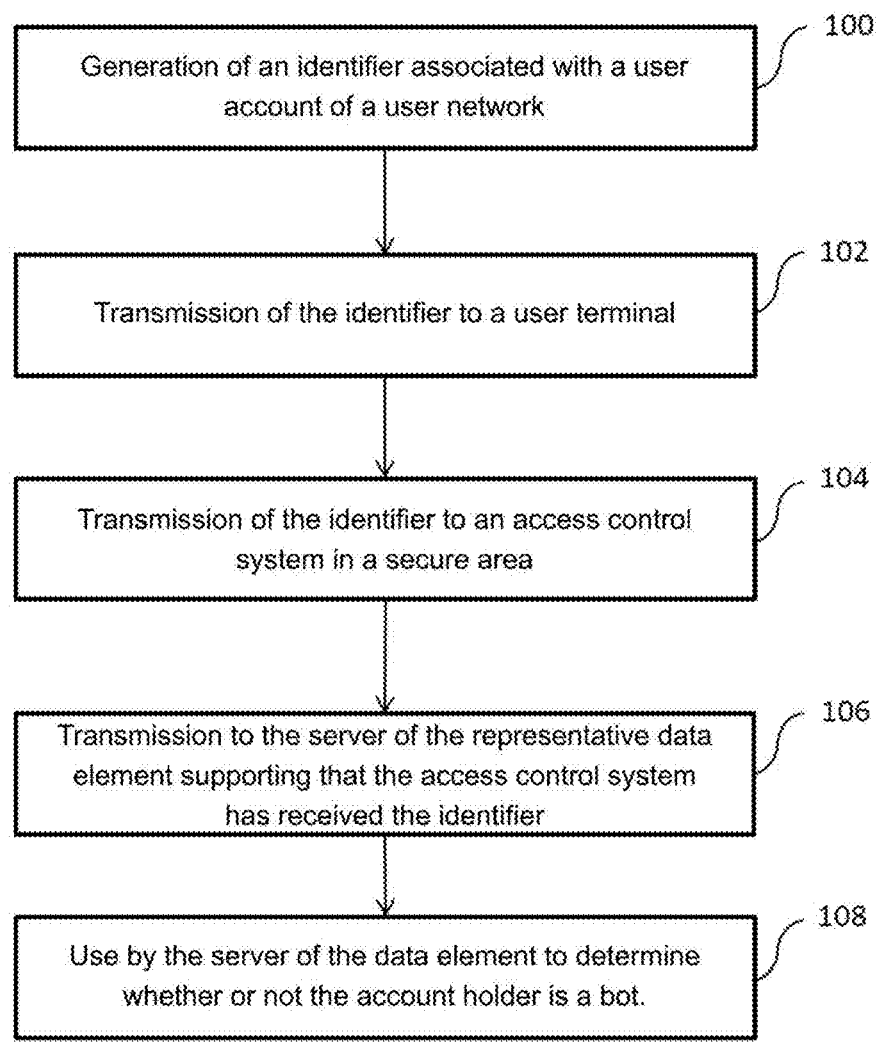

METHOD FOR DETECTING BOTS IN A USER NETWORK

CROSS-REFERENCE TO RELATED APPLICATIONS

This specification is based upon and claims the benefit of priority from French patent application number FR 1903448 filed on Apr. 1, 2019, the entire contents of which are incorporated herein by reference.

TECHNICAL FIELD OF THE INVENTION

The present invention relates to a method for detecting bots in a user network.

STATE OF THE ART

In a manner which is known per se, a computer bot, more simply called "bot", refers to an automatic or semi-automatic software agent posing as a human being in a user network.

Such bots can be programmed to destabilize the operation of a user network, for example, by spamming the network.

In order to prevent such problems, the user network organizer has every interest in detecting such bots.

For example, it is known that a social network account holder is required to provide supporting documents to prove he/she is a human. However, such a mechanism is tedious.

The use of biometrics has been also considered for distinguishing human users from bots in a social network. However, this idea has the disadvantage of being relatively complex to implement for the user network management, since it would require highly specialized equipment (biometric sensors). However, some network users do not always have this equipment, making the process not suitable for every situation.

OVERVIEW OF THE INVENTION

One objective of the invention is to detect bots in a user network in a simple and efficient way.

To this end, according to a first aspect of the invention, a method for detecting bots in a user network is proposed, the method comprising the following steps: receipt by a user terminal of an identifier associated with a network user account; transmission of the identifier by the user terminal to an access control system configured to determine whether or not a mobile terminal user has the right to access an area or service, the area or service being independent of the user network; transmission, by the access control system to a server, of a representative data element supporting that the identifier has been received by the access control system; and use by the server of the representative data element supporting whether or not the user of the account associated with the identifier is a bot or not.

The representative data element supporting that the identifier was received by the access control system to a secure area or service indirectly reveals that the mobile terminal user attempted access to the secure area or service. In addition, this identifier is associated in its own right with a network user account. Therefore, this data indicates that the account holder is a human being; that is why the use of this data is relevant to decide whether or not the account holder is a bot. In fact, the invention cleverly profiles a situation that can only be performed by a human being, namely requesting access to a secure area or a secure service independent of the user network, to distinguish humans from bots in this user network.

The process according to the first aspect of the invention may further comprise the optional features as defined below, either alone or combined, whenever technically possible.

Preferably, the transmission steps are repeated, wherein the data transmitted to the server is indicative of a frequency at which the identifier was received by the access control system.

Preferably, the user account defines a login identifier that allows a user to connect to the network, wherein the identifier received by the user terminal is a secondary identifier different from the login identifier.

Preferably, the identifier received by the terminal is a temporary data element with a limited validity period.

Preferably, the user terminal receives several identifiers that are all associated with the same network user account, but which are respectively associated with access control systems for different areas or services, the transmission steps are implemented for each identifier and the access control system associated with this identifier, the server using each representative data element transmitted by an access control system to determine whether the user of the user account is a bot or not.

Preferably, the identifiers are different from each other.

Preferably, different trust levels assigned to different access control systems are also used by the server to determine whether or not the user of the user account is a bot or not.

Preferably, data indicative of the geographical location of the zones are also used by the server to determine whether or not the user of the user account is a bot.

For example, the considered area is a building, part of a building and/or is accessible by any means of transportation. The service under consideration may be a banking service, for example a cash withdrawal or a banking transaction.

Preferably, the user network is managed by an infrastructure that comprises the server but does not include an access control system.

Preferably, a representative data element supporting that the identifier has been received by an access control system is transmitted to the server so that the access control system remains anonymous to the server.

A second aspect of the invention further proposes a system for detecting bots in a user network, the system comprising a server, a user terminal and an access control system configured to determine whether or not a mobile terminal user has the right to access an area or service, the area or service being independent of the user network, wherein the user terminal is configured to receive at least one identifier associated with a user account in the network and transmit the identifier to the access control system; the access control system is further configured to transmit to the server a representative data element supporting that the identifier has been received by the access control system; and the server is configured to use the representative data element to determine whether or not the user of the account associated with the identifier is a bot or not.

DESCRIPTION OF THE FIGURES

Other characteristics, goals, and advantages of the invention will become clear from the following description, which is purely illustrative and non-limiting, which must be read in the context of the attached drawings in which:

FIGS. 1 and 2 schematically illustrate a bot detection system in a user network.

FIG. 3 is a flowchart describing the steps for a bot detection process in a user network, according to an embodiment of the invention.

In the set of figures, similar elements are marked with identical references.

DETAILED DESCRIPTION OF THE INVENTION

With reference to FIG. 1, a bot detection system in a user network R comprises a server 1, a user terminal 2, and at least one access control system 3.

The server 1 is part of an infrastructure that gives users access to the network R. The user network R is, for example, a social networking platform connected to the Internet, a platform commonly known as a "social network".

The user terminal 2 is intended to be owned by a human user of the network R. It can be a smartphone, a laptop computer, or a chip card, for example.

In addition, a function of the access control system 3 is to control a user's access to an area or service. The area or service is independent of the user network R.

In particular, the access control system 3 is not part of the infrastructure that manages the user network R.

With reference to FIG. 2, the server 1 typically comprises a communication interface 10, a data processing unit 12, and a memory 14.

The communication interface 10 is connected to the Internet.

The processing unit 12 comprising, for example, at least one processor configured to run a computer program.

The function of the processing unit 12 is to manage user accounts for this user network R. The server 1 can, for example, be configured to register new users, i.e. create accounts for them in order to access the user network R. An account defines a login identifier and a password for a newly registered user.

The processing unit 12 can also be configured to control user access to the user network R or certain services on that network. During such a control step, the server 1 checks whether the login and password entered by a user intending to access the user network R correspond to a previously created account.

The processing unit 12 also has a bot detection function in the user network R. As shown below, the processing unit 12 relies on specific data to decide whether or not the account holder is a bot.

In addition, the user terminal 2 also comprises a first communication interface 20 for communicating with the server 1, a second communication interface 22 for communicating with the access control system(s) 3, a memory 24 and a data processing unit 26.

The first communication interface 20 can be configured to access the Internet. It is preferably a radio-like wireless network interface controller, for example a mobile (3G/4G/5G) or W-Fi network card.

The second communication interface 22 is also preferably a radio-like wireless network interface controller. The first communication interface 20 and the second communication interface 22 may actually be one single communication interface. Alternatively, the second communication interface 22 is of a different type from the first communication interface 20. For example, the second interface is of the near-field communication (NFC) or Bluetooth type.

The memory 24 is non-volatile, e. g. of the SSD, HDD, Flash, EEPROM type, etc. It is suitable for storing data received by the first communication interface 20.

The data processing unit 26 is configured to control or participate in a data communication with the access control system 3 via the second communication interface 22.

The data processing unit 26 can also run an application that acts as an interface to access the user network R. Such a program or application can, for example, be downloaded to an online download platform.

The control system 3 comprises a first communication interface 30 for communicating with the user terminal 2, a second communication interface 32 for communicating with the server 1, a memory 34 and a data processing unit 36.

The first communication interface 30 is of the same type as the second communication interface 22 of the user terminal 2.

The second communication interface 32 is wired (Ethernet) or wireless (Wi-Fi, Bluetooth, etc.). It can be of the same type as the first communication interface 32 of the user terminal 2.

The memory 34 is non-volatile, e. g. of the SSD, HDD, Flash, EEPROM type, etc. It is suitable for storing data received by the first communication interface 30.

The data processing unit 36 comprises at least one processor. In particular, it is configured to determine whether or not a user has the right to access an area controlled by the access control system 3, or to access a service that the system is likely to provide to such a user.

In the case of an access control to an area, the access control system 3 may further comprise a gateway (see FIG. 1) that can be opened to allow a natural person to access the area in question, or closed to prevent the natural person from accessing said area. In this case, the first communication interface 30 can be included in said gateway, so that a communication can be established between the user terminal 2 and the access control system 3, when the user terminal 2 passes near the gateway.

For example, the area concerned is an area providing access to a means of transportation such as a train or metro (in which case the gateway is located upstream of a platform) or an aircraft (in which case the gateway is located in an airport). In another example, the area is a building or part of a building. The gate can then be located in the lobby of a building.

In the case of an access control to a service, this service may be a banking service, for example a cash withdrawal, in which case the access control system comprises a cash dispenser, located for example outside or inside a building.

Alternatively, the service may be a bank transaction, in which case the control system comprises a payment terminal (Point of Sale or POS) capable of communicating with a bank server. Such a payment terminal is typically used in a business, for example a shop, restaurant, etc.

Regardless of the type of access considered (to an area or service), this access does not imply access to the user network R itself.

Although only one access control system is shown in FIGS. 1 and 2, it is understood that the box detection system in the user network R may comprise several access control systems 3 controlling access to different respective areas or services, each of these systems 3 being as previously described.

With reference to FIG. 3, a bot detection method in the user network R comprises the following steps:

In a preliminary step, a user registers with the server 1, so as to join the user network R. During this registration, known per se, the processing unit 12 generates an account for this user that comprises a login identifier and a password, which will then allow the user to access the services on the user network R, for example, from his/her user terminal 2, or from another terminal.

At this stage, there is uncertainty about the nature of the registered user (natural person or bot).

The processing unit 12 of the server 1 generates at least one other identifier ID for this user, which is hereinafter referred to as "secondary identifier" in order to differentiate it from the login identifier (step 100).

Unlike the login identifier, the secondary identifier ID is not intended to be used by the user to log in the network R. As shown below, this secondary identifier ID is used indirectly to determine whether the user is a bot or not.

It is also assumed that the server 1 has detected that the user terminal 2 belongs to the user who registered. In order to do this, the server 1 can simply identify from which device an R (registration) network membership request has been sent. In this case, the existence of a user terminal 2 can be known to the server 1 upon registration. Alternatively, such detection can be performed when a network R connection application installed on the user terminal 2 is used by a user of that terminal to attempt to connect to the network R, by entering his/her login and password.

Subsequently, the user terminal 2 receives the generated secondary identifier ID (step 102).

For example, the secondary identifier ID is transmitted by the server 1 to the user terminal 2 via a communication channel established between communication the interfaces 10 and 20. This transmission is, for example, requested by the application installed in user terminal 2, or initiated spontaneously by the server 1. Alternatively, the user terminal obtains the secondary identifier ID through another channel, involving a third-party equipment, for example.

The secondary identifier ID is stored in the memory 24 of the user terminal 2.

Subsequently, the user of user terminal 2 moves closer to the secure area controlled by the access control system 3. For example, if the secured area is an area allowing access to a means of transportation, this user approaches a gateway blocking access to this means of transportation.

To open the gateway, the user approaches his/her user terminal 2 to the gateway, so that a communication is established between the communication interface 22 of the user terminal 2 and the communication interface 30 of the access control system 3.

The processing unit 36 implements an access control step during which it determines whether or not the holder of the user terminal 2 has the right to access the secure area, based on the information exchanged with the user terminal 2.

For example, in the case of access to a transportation means, the user terminal 2 may be deemed to be a transportation ticket, in the sense that it can store data representing a virtual transportation ticket. The purpose of the communication between the user terminal 2 and the access control system 3 is to determine whether or not this ticket is valid, i.e. whether or not the user of the mobile terminal has the right to access the means of transportation. If this is the case, the gateway opens to allow access to this means of transportation. Otherwise the gateway remains closed.

In conjunction with this access control, the user terminal 2 transmits to the access control system 3 the secondary identifier ID it had previously stored (step 104).

The secondary identifier ID is then stored in the memory 34 of the access control system 3.

The date on which the secondary identifier ID was transmitted by the user terminal 2 to the system is also stored in the memory 34, along with the secondary identifier ID.

The transmission step 104 is implemented each time the user requests the access system access to the secure area. As a result, the secondary identifier ID may be associated in the memory at different dates.

The processing unit 36 can also store in the memory 34 an access control result data (i.e. data indicating whether the control system 3 has given the mobile terminal user 2 access to the secure area).

The processing unit 36 of the access control system 3 generates at least one representative data element D supporting that the identifier was received by the access control system 3.

Preferably, the data element D comprises a frequency at which the identifier was received by the access control system 3, following several requests from the access control system 3 to the secure area by the holder of the user terminal 2. This frequency is representative of a frequency at which the user of user terminal 2 attempted to obtain access to the secure area.

This frequency can be calculated, for example, as a delay between two successive implementations of the step of transmitting the secondary identifier ID from the user terminal 2 to the access control system 3, or as a number of such transmissions within a period of time of a predetermined duration.

The access control system 3 transmits to the server 1 the representative data element D supporting that the identifier was received by the access control system 3 (step 106).

Preferably, this transmission is performed in such a way that the access control system 3 remains anonymous with respect to the server 1. "Anonymous" means that the server 1 does not receive any information to determine the access (to an area or service) controlled by the control system 3. This is advantageous since it is more respectful of the privacy of the holder of the user terminal 2: it is not desirable for the infrastructure that administers the user network to have to know the different access attempts that the user requires.

The control system 3 can also transmit the identifier ID to the server, in combination with the data element D.

On the other hand, the access control system 3 does not transmit to the server 1 the dates stored therein, in order to preserve the privacy of the user of user terminal 2.

Steps 100, 100, 104, 106 above may be repeated for several access control systems 3 to different secure areas. In this case, it is preferable that the server 1 generate different secondary identifiers respectively associated with these different access control systems. As many secondary identifiers are generated during step 100 as there are access control systems to secure areas. Alternatively, the same secondary identifier ID can be shared between several different access control systems 3; in other words, the number of secondary identifiers generated is, in this case, lower than the number of access control systems 3.

The server 1 uses the data it receives via its communication interface 10 from at least one access control system 3 to determine whether or not the holder of the user account to which the secondary identifier is associated is a bot (step 108).

For example, in a particularly tolerant embodiment, the server 1 considers that this user is not a bot as soon as it receives a representative data element from the access control system 3 supporting that the secondary identifier ID was received by this access control system 3.

In more demanding embodiments, the server 1 may only decide that the user is not a bot when more conditions are met. The server 1 may require that an ascent frequency D should be greater than a predetermined threshold.

The server 1 may further require that data is transmitted by several access control systems to different secure areas rather than just one.

These conditions can be used alternatively or cumulatively.

When several access control systems 3 are used, these systems may be assigned different levels of trust by the server 1. The server 1, for example, stores in its memory 14 the respective trust levels of the different access control systems 3. When the representative data element D supporting that the identifier ID has been received by an access control system 3 is transmitted to the server 1, this data element D is weighted by the confidence level assigned to the access control system 3 before use by the server 1 for deciding on the bot nature or not of the account holder associated with the corresponding secondary identifier ID.

The server 1 can also use, for decision-making purposes, data indicative of the geographical location of the different access control systems 3 that have been requested and go back to the server 1 of the data D. These geographical locations can be predetermined and stored in the memory of server 1. Alternatively, access control systems can transmit their own location data to the server 1.

In any case, the server 1 may decide whether the account holder is a bot or not when seemingly contradictory data are reported by several access control systems. For example, these may be two high access frequencies that are ascended by two access control systems for which step 104 took place at two locations apart from each other. For example, the server 1, knowing that a user requests daily access to the Paris metro and also requests daily access to the Moscow metro, may conclude that this user is a bot.

Here is an example of a list of information that can be retrieved, stored in the memory 14, and used for step 108 for decision-making purposes, in connection with a given user account.

Three secondary identifiers ID1, ID2, ID3
Different partners managing different access control systems
partner 1: European, high trust
partner 2: European, medium trust
partner 3: American, high trust
for a given period of time:
ID1: frequent visits to partner 1
ID1: daily visits to partner 2
ID2: a visit to partner 3
ID3 has never been used Preferably, a secondary identifier ID generated by the server 1 is a temporary data element with a limited validity period. After a predetermined period of time, the server 1 generates a new secondary identifier ID associated with an access control system 3 to an area or service, and transmits it to the user terminal 2.

Regardless of the policy adopted by the server 1 to decide whether or not an account holder is a bot, the server 1 can make decisions that are effective only for a limited period of time. For example, the server 1, concluding that an account holder is not a bot, since it has requested a particular control system 3 access to an area or service, may suspend its control verifications on that account holder for a predetermined period. Once this period has expired, the server 1 can review again whether or not the holder is a bot. Conversely, the server 1, concluding that the account holder is a bot, may ban the account holder from the user network R (i.e. prevent him from accessing services on the user network R) for a predetermined period of time. After this period, the server 1 can re-evaluate whether or not the holder is a bot.

Of course, the invention is not limited to the previously described embodiments. In particular:

It is not necessary for the server 1 that determines the nature of a user (either bot or not) to also be the server that registers new users. All that is required is that the server 3 can access a memory that stores the network's user accounts.

The invention is not limited to the case of a social network; it is applicable to any network to which users can access through a user account, behind which a bot is likely to hide: an online gaming sites, dating site, etc.

It is not necessary for a server 3 and the server 1 to communicate directly therebetween through a direct communication channel. A data element can be transmitted by an access control system 3 to the server 1 via a third-party system.

The invention claimed is:

1. A method comprising:
receiving, by a user terminal, an identifier associated with an account on a website,
transmitting, by the user terminal, the identifier to an access control system configured to determine whether or not an owner of the user terminal has a right to access an area or a service, the area and the service being independent of the website,
transmitting, by the access control system to a server, data indicating that the identifier has been received by the access control system, wherein the access control system is not part of an infrastructure that manages the website,
using, by the server, said data to determine whether or not the account is a bot account.

2. The method according to claim 1, wherein transmitting the identifier and transmitting said data are repeated over time, and wherein the data transmitted to the server indicate a frequency at which the identifier has been received by the access control system.

3. The method according to claim 1, wherein the user account defines a login identifier allowing a user to log in the website, and wherein the identifier received by the user terminal is a secondary identifier different from the login identifier.

4. The method according to claim 1, wherein the identifier received by the terminal is temporary data having a limited validity period.

5. The method according to claim 1, wherein the user terminal receives several identifiers which are all associated with the account, but which are respectively associated with access control systems giving access to different areas or services, wherein transmitting the identifier and transmitting the data are implemented for each of the several identifiers and for each of the access control systems, and wherein the server uses data transmitted by the access control systems to determine whether or not the account is a bot account.

6. The method according to claim 5, wherein the identifiers are different from each other.

7. The method according to claim 5, wherein different trust levels assigned to the different access control systems are also used by the server to determine whether or not the account is a bot account.

8. The method according to claim 5, wherein data indicative of a geographical location of the areas are also used by the server to determine whether or not the account is a bot account.

9. The method according to claim 1, wherein:
the area is a building, part of a building and/or provides access to a means of transportation, or
the service is a banking service.

10. The method according to claim 1, wherein the website is administered by the infrastructure, and the infrastructure comprises the server but not the access control system.

11. The method according to claim 1, wherein said data indicating that the identifier has been received by the access control system is transmitted to the server such that the access control system remains anonymous with respect to the server.

12. The method according to claim 1, wherein the website is a social networking website.

13. A system comprising:
a user terminal configured to: receive an identifier associated with an account on a website, and transmit the identifier,
an access control system configured to determine whether or not an owner of the user terminal has a right to access an area or service, the area and the service being independent of the website, the access control system being further configured to: receive the identifier transmitted by the user terminal, and transmit data indicating that the identifier has been received by the access control system, wherein the access control system is not part of an infrastructure that manages the website, and
a server configured to receive the data transmitted by the access control system and use said data to determine whether or not the account is a bot account.

14. A method comprising:
receiving, by a user terminal, an identifier associated with an account on a website,
transmitting, by the user terminal, the identifier to an access control system configured to determine whether or not an owner of the user terminal has a right to physically enter an area, the area being independent of the website,
transmitting, by the access control system to a server, data indicating that the identifier has been received by the access control system, wherein the access control system is not part of an infrastructure that manages the website, and
using, by the server, said data to determine whether or not the account is a bot account.

* * * * *